July 28, 1959  O. WELTER  2,897,387
INDUCTION MOTOR
Filed May 23, 1950  2 Sheets-Sheet 1
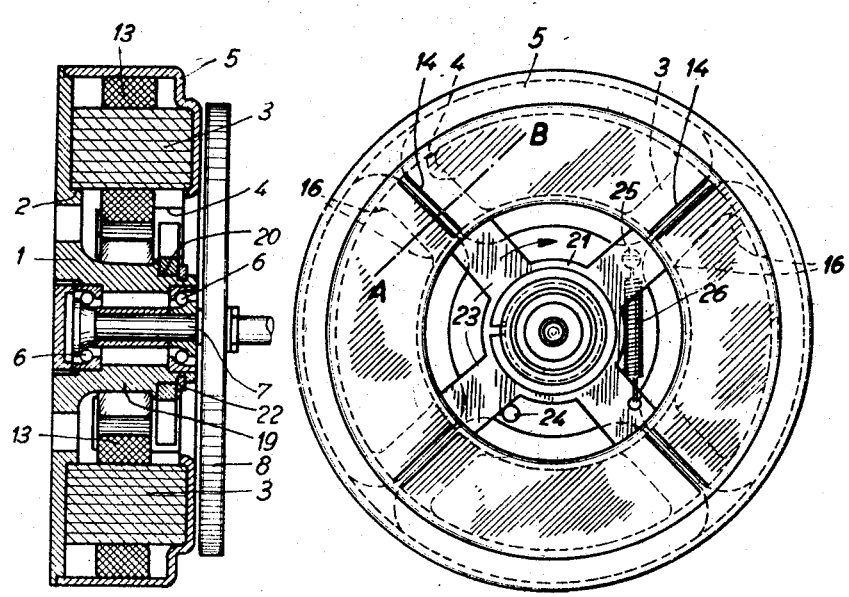
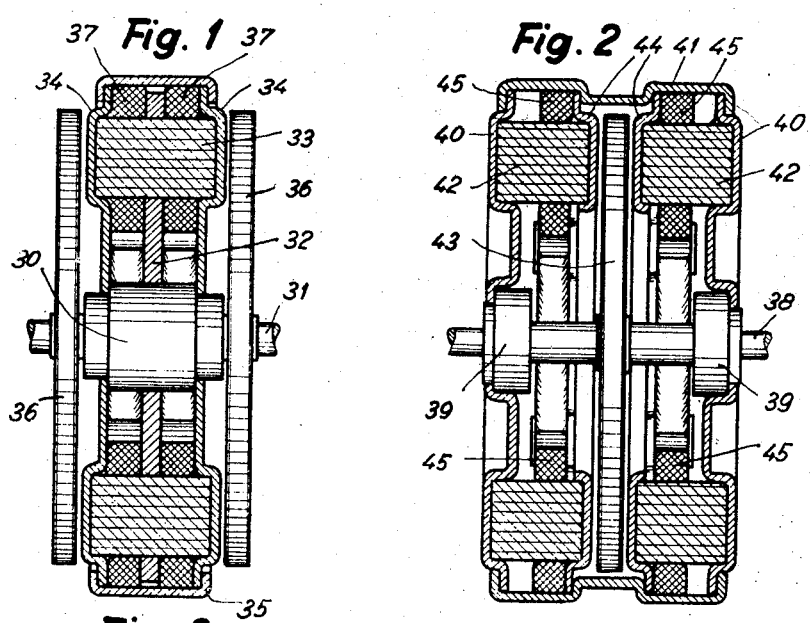
Fig. 1  Fig. 2
Fig. 3  Fig. 4

July 28, 1959　　　　　　　O. WELTER　　　　　　2,897,387
INDUCTION MOTOR
Filed May 23, 1950　　　　　　　　　　　　　　2 Sheets-Sheet 2
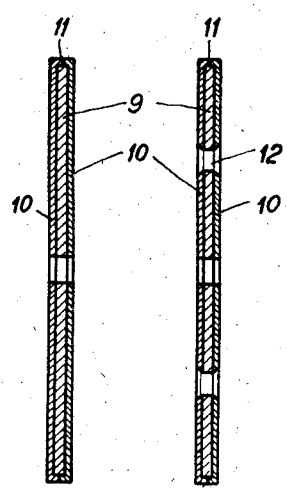
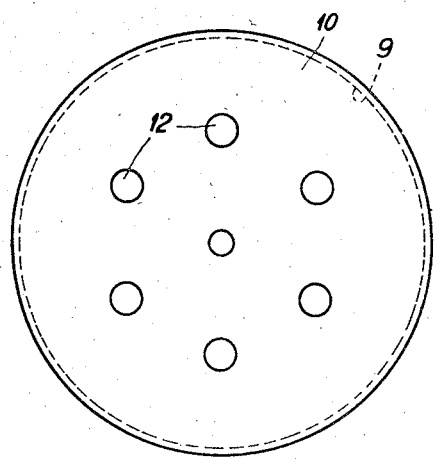
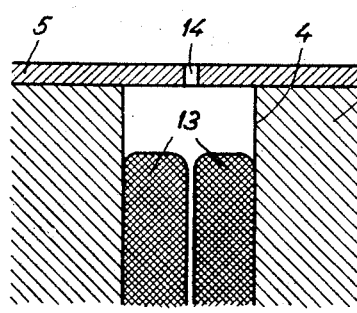
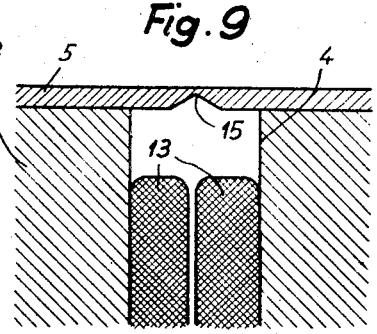

United States Patent Office 2,897,387
Patented July 28, 1959

2,897,387
INDUCTION MOTOR

Otto Welter, Orselina, Switzerland, assignor to Elektro-Motoren A.G., Zug, Switzerland Application May 23, 1950, Serial No. 163,579

Claims priority, application Switzerland May 24, 1949

5 Claims. (Cl. 310—268)

The present invention relates to electric motors and more especially to induction motors. The invention relates particularly to induction motors of the kind having a disc-shaped short-circuited rotor disposed in facing relation with the pole faces of the stator.

Induction motors of this kind are already known. They have slots between the poles or claws of the stator and these slots grow narrower towards the front surface thereof, i.e. towards the short-circuited rotor, for reasons well-known to those skilled in the art. When manufacturing such induction motors the wires of the stator winding must be put individually into the slots from the face of the stator, and be connected to one another to the well-known twisted winding. This manufacturing process calls for a lot of work and therefore is extremely expensive. Such high working costs may be justified when manufacturing high-powered motors, but up to now all attempts for manufacturing small motors by a cheap process failed. If the efficiency of the motor is of secondary importance, then the manufacturing expenses may be substantially lowered when, according to my invention, the poles of the stator form claws, the cross section of which, when seen from the front or face, is unchanged over the whole height of these claws.

My invention also contemplates a method for manufacturing such induction motors, this method comprising the steps of winding up the windings for the several poles of the stator onto a core having substantially the same circumference as the poles, of stripping away each so obtained winding from the core and sliding it onto one of the poles of the stator, and of establishing the required connections between the windings slid onto the poles.

According to my invention, the electric properties of my induction motor may furthermore be substantially improved by providing a soft iron sheet covering the rotor side face of the stator, and furthermore by providing in this sheet diminutions of thickness in the middle between two adjacent pole faces. On the other hand, the manufacturing costs may be substantially lowered when making the short-circuited rotor of a disc of iron having a coating of copper at least on the side thereof facing the stator. The copper coating may be constituted by a layer of copper sprayed onto the iron disc. Alternatively it may be constituted by two discs of copper provided on each side of the disc of iron.

An induction regulator may be rotatably mounted on the axle of the short-circuited rotor.

My induction motor may be double-acting, the disposition being such that the axial shifts compensate each other.

Other objects of this invention will appear hereinafter as the description of the invention proceeds, the novel features, combinations and constructions being more particularly pointed out in the specification and the claims hereunto appended.

The annexed drawings represent, by way of examples, some embodiments of the induction motor according to the invention and of the method for manufacturing same.

Fig. 1 is a side view of a first embodiment partly in section along a plane containing the axis of the rotor.

Fig. 2 is an elevational view of this embodiment,

Figs. 3 and 4 are views of a second and third embodiment, respectively, these views being similar to that of Fig. 1.

Fig. 5 is a front elevation view of a short-circuited rotor pertaining to any one of these embodiments, Figs. 6 and 7 are diametrical sections of this rotor, showing two different structures thereof.

Fig. 8 is a section view along the line A—B of Fig. 2 on an enlarged scale, showing a detail of a soft-iron sheet covering the poles of the stator and Fig. 9 is a view similar to Fig. 8, showing a modification of the said soft-iron sheet.

Referring now to the drawings, in which similar reference numerals indicate similar parts, and more particularly to Figs. 1 and 2, a shield forming a base is indicated at 1. This shield is preferably constituted by a light-metal casting and possesses a peripheral shoulder 2 on which the stator 3 is seated. The latter is constituted by a ring assembled from bands of soft iron or constituted by a pressing of sintered soft-iron powder. This stator ring possesses recesses 4 which are limited by the lateral surfaces of four stator poles having all the same size. The faces of the stator poles which are located away from the shield 1 are covered by a soft-iron sheet 5 making part of the casing of the motor. An axle 7 rotatably mounted on the shield 1 by means of a ball-bearing 6 carries a short-circuited rotor 8 keyed thereto. The structure of this rotor is that shown in Fig. 6 or Fig. 7. Accordingly the rotor is built-up of an iron disc 9 having a coating of copper. This coating must be provided at least on that side of the rotor which faces the pole of the stator. In the example represented by Fig. 6 the disc 9 of iron is provided on both sides with discs 10 made of copper and with peripheral flanges bent towards each other and soldered to each other. In the embodiment of Fig. 7, there are moreover a plurality of rivets 12 made of copper and connecting the two discs 10 to each other. The induced short-circuit current then flows through the soldered connections of the periphery of the rotor and more to the center of the rotor through the rivets 12. The coating on the iron disc 9 could also be obtained by spraying a layer of copper onto at least one of the side surfaces of the iron disc.

Owing to the fact that the pole claws of the stator, when seen from the front side, have a cross-section which does not change from the base of these claws over the whole height thereof, the windings of the stator may be put on in a very simple and cheap manner. The steps involved comprise that of winding-up one after another the windings onto a core having substantially the same periphery as the stator poles, this core having preferably a circular cross-section, that of stripping away from the core each of the so-formed windings, furthermore that of bending the winding into the shape of the stator poles, that of sliding the so obtained winding onto the several stator poles, and thereafter that of establishing the necessary connections, whereafter the stator is fastened to the shield and covered with the soft-iron sheet 5. Care should be taken that the narrow slots 14 which are punched into the soft-iron sheet 5 covering the front surface of the stator, and which extend in radial direction in said flat and ring-shaped sheet 5, are located in the middle of the recesses or slots determining each pair of adjacent poles of the stator. In this manner the disposition is obtained which is shown at an enlarged scale by Fig. 8. It becomes obvious from this figure that the structure shown thereby is at least equivalent to slotted stators when considering electrotechnic properties, and the slots 14 have the task to bring the magnetic flux in a higher degree into the field of action of the short-circuited rotor. Instead of slots 14 notches 15 could be provided in the surface of the soft iron sheet 5 facing the poles of the stator, these notches occupying the same position with regard to the poles as the slots 14 of Fig. 8 as shown by Fig. 9. It should be stressed that neither the diminutions of thickness constituted by the notches 15 nor those constituted by the slots 14 are absolutely necessary. But they help to improve by a substantial extent the efficiency of the motor.

In the practice, the edges of the stator claws are biased as shown at 16 in Fig. 2 so as to not damage the windings when the latter are put onto these claws. On a portion 20 of the hub 19 of the stator 3, having a reduced diameter, an induction regulator 21 is loosely mounted for rotation, but held against axial movement by a split ring 22. This induction regulator 22 is in the shape of a cross. The arms 23 of the induction regulator are in a position between two adjacent pole claws, when the operation tension is at zero or when this tension does not exceed the value corresponding to the normal function of the motor, and the axes 46 of the arms 23 are angularly shifted with regard to those 47 of the recesses 4, as indicated in Fig. 2, in such a manner that the lateral surface 48 of any of said arms is nearer to the pole claw located before it when following the rotation direction indicated by the arrow in Fig. 2, than to the other pole claw behind it. A pin 24 prevents the induction regulator from rotating in the undesired direction. A spring 26 has one of its ends fastened to an arm of the induction regulator 21 and its other end fastened to a screw 25 fixed to the casing shield 1. This spring is calibrated so that it permits a rotation of the induction regulator in the direction of the arrow (Fig. 2) only when a twining force acts on the regulator which corresponds to a tension exceeding the tension for normal operation.

The operation of the induction motor is similar to that of any known induction motor and especially of any induction motor having a short-circuited rotor disposed to face the front surface of the stator pole. Thus, the current flowing through these stators generates an alternating field which in turn generates a corresponding alternating field in the short-circuited rotor and this field has a phase lag with regard to the field of the rotor owing to the remanence of the iron of the rotor. The induction regulator 21 which in some manner operates as a separate short-circuited rotor constitutes a variable magnetic shunt. If, for example, the windings of the stator are branched to a network having a tension higher than the normal tension, then the regulator 21 is rotated against the action of the afore-mentioned spring in the direction of the arrow. The arms 23 come into a position in which they are directly in front of the adjacent pole claw, so that the magnetic resistance of the stator is diminished whilst the inductive resistance of the stator circuit is increased. By giving the parts a suitable size, it is possible that owing to the increase of the inductive resistance the field acting onto the short-circuited rotor and therefore the moment force acting onto the latter are held constant, when the input tension varies, what results in the rotation speed of the rotor remaining constant independently of the motor tension. In fact each increase of the input tension is then compensated by an increase of the inductive resistance.

The recesses or slots 4 which do not become narrower from the base of the stator pole to the top thereof simplify to a large degree the positioning of the windings 13. The stator therefore may be manufactured at low working costs. The same may be said of the described short-circuited rotor. Moreover, the compact structure permits to reduce the dimension of a large number of small apparatus intended to include such motors, whilst the force of the motor must be necessarily smaller. This is a consequence of the fact that, owing to the disc-like shape of the rotor, the electro-motive force acts at a relatively great distance from the rotaion axis. Owing to the induction regulator incorporated to the motor, the latter is to a large extent independent of the input tension so that the well-known switch means often used with a great number of electric apparatus may be dispensed with. It is easy to understand that the induction motor described hereabove may be modified as well structurally as electrically. One modification may involve the provision of short-circuiting rings on the claws of the stator, resulting in the generation of a rotating field acting onto the rotor, the magnetic flux being branched into a loaded portion and an unloaded portion. The rotor may then be made of hardened steel and starts in the manner of an asynchronous rotor. Due to the remanence of the steel rotor, oriented magnetic poles are formed which are combined in their action with that of the rotary field, so that the rotor runs synchronous with the rotating field and thus with the frequency of the exciting alternative current.

Furthermore, three stator fields may be foreseen, one of which is shifted with regard to the others. The rotor is made with a short-circuited winding. The said third field winding may be conected to the alternative current network over a capacitor so that a rotating field is generated and so that the motor starts in the manner of asynchronous motors and then continues rotating with a speed depending on the number of poles and being approximately proportional to the frequency, with some slip.

Concerning the mechanical structure, the modifications shown by Figs. 3 and 4 come into consideration. Both these figures show double-acting induction motors in which the axial thrusts compensate each other. In the modification shown by Fig. 3 there is a short-circuited rotor on each side of the stator. The construction is, in short, the following. On a bearing 30 for the rotor axle 31 a disc of aluminum 32 is fixed which possesses slots or recesses into which the poles 33 of the double-acting stators are inserted. Soft-iron discs 34 are also fastened to said bearing. These parts are preferably constituted by pressings and constitute together with the ring 35 the casing of the motor. The stator poles and the short-circuited rotors 36 have the same characteristic features as the similar parts of the first embodiment and need not be described once more. The method of manufacturing too has a great resemblance with that for manufacturing the first embodiment and its description is not repeated.

The modification shown by Fig. 4 comprises a rotor axle 38 mounted for rotation into bearings 39 which are inserted into casing parts 40 made of sheet-metal and held together by a casing ring 41 made of sheet metal too. There are two stator 42 whose front surfaces, facing each other and the single short-circuited rotor 43, are covered by soft-iron sheets 44 and carry the windings 45 which are brought in position in the manner described with reference to Figs. 1 and 2. The details of the structure of the stators 42 and of the single rotor 43 are similar to those already described. The electrical operation is the same too, but the axial thrust compensate each other in both the modifications according to Figs. 3 and 4. In fact, the attraction forces of the single stator upon the two shirt-circuited rotors and of the two stators onto the single short-circuited rotors, respectively, are directed oppositely to each other. It should furthermore be pointed out that the manufacturing costs of the induction motors of Figs. 3 and 4 are very low owing to the provision of casing parts made of sheet metal.

The modifications shown by Figs. 3 and 4 could include an induction regulator of the kind described with reference to Figs. 1 and 2, and quite generally it should be stressed that the characteristical features of the improvement described hereabove, could be combined in any appropriate manner.

Finally, the attention should be directed onto the fact that motors of the kind with a collector could be made

What I claim is:

1. In an induction motor adapted to operate at a predetermined voltage, in combination, a stator having a plurality of identical poles which are located apart from each other by identical distances so as to provide a plurality of equal spaces between said poles; a rotatably mounted, magnetic member located between said poles and having a plurality of arms equal in number to the number of poles and which are equally spaced from each other and extend toward said poles, each of said arms having a width greater than each of said spaces and being located non-symmetrically over said spaces so that each of said arms overlaps one of a pair of adjacent poles by a greater amount than it overlaps the other of said pair of adjacent poles, whereby, when the predetermined voltage is increased, each of said arms of said member is rotated toward said one of said poles to overlap the same to a greater extent; stop means engaging one of said arms of said member for preventing the rotation of the latter in one direction of rotation; and spring means operatively connected to said member and urging the same in said one direction of rotation.

2. In an induction motor adapted to operate at a predetermined voltage, in combination, a rotatably mounted induction regulator means comprising a rotatably mounted hub and a plurality of equally spaced, identical arms extending from said hub, so that each of said arms has an outer end, said hub and arms being made of a magnetic material; an annular stator closely located about said induction regulator and having an inner periphery located closely adjacent to said outer ends of said arms, said stator having a pair of opposite side faces one of which is formed with a plurality of identical stator poles equal in number to the number of said arms and which are located at equal distances from each other so as to provide a plurality of equal spaces between said poles, each of said spaces being of a lesser width than the width of each of said arms and being located over each of said arms but out of line with the same so that each of said arms overlaps one end of each of said poles by a greater extent than the succeeding arm overlaps the opposite end of each of said poles, whereby, when the predetermined voltage is increased, said induction regulator is rotated in one direction of rotation so that each of said arms overlaps said one end of each of said poles to an increasing extent; stop means engaging one of said arms for preventing rotation of said induction regulator in a direction opposite to said one direction of rotation; and spring means operatively connected to said induction regulator and urging the same in said opposite direction of rotation.

3. An induction motor comprising an annular stator and a short-circuited disc-like rotor located beside and facing said stator, the latter having a plurality of spaced poles directed toward one side of said rotor and each having a cross section which is the same in all planes normal to the rotor axis, a soft-iron sheet covering said poles of said stator and being located between said poles and said rotor, and an induction regulator rotatably mounted on a circular portion of the motor, said induction regulator having the shape of a cross with a number of arms equal to the number of poles of the stator, and means for positioning said arms between the pairs of adjacent stator poles, but nearer to one pole than the other, said means comprising a spring attached to the induction regulator and to a fixed part of the motor, and an abutment means for the induction regulator.

4. An induction motor according to claim 3, said spring being calibrated to permit a rotation of the induction regulator only when the input voltage exceeds the normal operating voltage of the motor.

5. An induction motor comprising an annular stator and a short-circuited disc-like rotor located beside and facing said stator, the latter having a plurality of spaced poles directed toward one side of said rotor and each having a cross section which is the same in all planes normal to the rotor axis, and a soft-iron sheet covering said poles of said stator and being located between said poles and said rotor, said soft-iron sheet constituting a part of a casing for the motor.

References Cited in the file of this patent

UNITED STATES PATENTS

| | | |
|---|---|---|
| 428,650 | Thomson | May 27, 1890 |
| 518,310 | Duncan | Apr. 17, 1894 |
| 1,605,796 | Tanzler | Nov. 2, 1926 |
| 1,737,128 | Ross | Nov. 26, 1929 |
| 1,839,299 | Cornu | Jan. 5, 1932 |
| 1,942,649 | Johnson | Jan. 9, 1934 |
| 2,004,866 | Haldeman | June 11, 1935 |
| 2,111,934 | Liner | Mar. 22, 1938 |
| 2,245,577 | Diekman | June 17, 1941 |
| 2,246,777 | Bordeaux | June 24, 1941 |
| 2,247,890 | Reardon | July 1, 1941 |
| 2,433,390 | Packer | Dec. 30, 1947 |
| 2,449,925 | Aske | Sept. 21, 1948 |
| 2,469,808 | Aske | May 10, 1949 |
| 2,479,589 | Parker | Aug. 23, 1949 |

FOREIGN PATENTS

| | | |
|---|---|---|
| 525,026 | Great Britain | Aug. 20, 1940 |